United States Patent [19]

Belart et al.

[11] Patent Number: 4,643,486
[45] Date of Patent: Feb. 17, 1987

[54] SLIP-CONTROLLED BRAKE SYSTEM FOR AUTOMOTIVE VEHICLES WITH DRIVEN FRONT AND REAR AXLE

[75] Inventors: Juan Belart, Walldorf; Lutz Weise, Mainz; Wolfram Seibert, Darmstadt, all of Fed. Rep. of Germany

[73] Assignee: Alfred Teves GmbH, Frankfurt am Main, Fed. Rep. of Germany

[21] Appl. No.: 706,031

[22] Filed: Feb. 27, 1985

[30] Foreign Application Priority Data

Mar. 1, 1984 [DE] Fed. Rep. of Germany ....... 3407539

[51] Int. Cl.$^4$ .................................................. B60T 8/44
[52] U.S. Cl. ..................................... 303/114; 303/119
[58] Field of Search ............... 303/113, 114, 115, 116, 303/119; 188/181 R, 181 A; 60/581

[56] References Cited

U.S. PATENT DOCUMENTS

| | | | |
|---|---|---|---|
| 4,340,257 | 7/1982 | Belart | 303/119 X |
| 4,395,072 | 7/1983 | Belart | 303/114 |
| 4,492,413 | 1/1985 | Belart | 303/114 X |
| 4,565,411 | 1/1986 | Seiber | 303/114 |

Primary Examiner—Duane A. Reger
Assistant Examiner—Robert J. Oberleitner
Attorney, Agent, or Firm—James B. Raden; William J. Michals

[57] ABSTRACT

A slip-controlled brake system for automotive vehicles with driven front and rear axles is equipped with a pedal-actuated braking pressure generator (1) comprising a power brake booster (2) connected to an auxiliary pressure source (4). The booster communicates directly with one or several wheel brakes (HR, HL) and which acts upon a master cylinder (3), to the working chambers (6, 7) of which the other wheel brakes (VR, VL) are connected. Electromagnetically actuatable multi-directional control valves (EV, AV, 16) contained in the pressure fluid conduits leading to the wheel brakes and in the pressure fluid return lines to a supply reservoir as well as in a pressure fluid conduit (14) leading from the power brake booster (2) to the master cylinder (3) serve on control action to reduce the braking pressure at the individual vehicle wheels and to deliver pressure into the master cylinder (3).

6 Claims, 2 Drawing Figures

SLIP-CONTROLLED BRAKE SYSTEM FOR AUTOMOTIVE VEHICLES WITH DRIVEN FRONT AND REAR AXLE

BACKGROUND OF THE INVENTION

The present invention relates to a slip-controlled brake system provided for automotive vehicles with driven front axle and rear axle and which is equipped with a pedal-actuated braking pressure generator comprising a power brake booster connected to an auxiliary pressure source. The booster communicates directly with one or several wheel brakes and which acts upon a master cylinder to the working chambers of which the other wheel brakes are connected. The brake system includes electromagnetically actuatable multi-directional control valves contained in the pressure fluid conduits leading to the wheel brakes and includes pressure fluid return lines which connect the wheel brakes with a pressure supply reservoir and which contain likewise electromagnetically actuatable multi-directional control valves. The system further comprises a normally closed pressure fluid conduit from the power brake booster to the master cylinder which can be switched to its opened position and additionally comprises wheel sensors and electronic circuits for the determination of the wheels' rotational behavior and for the generation of valve control signals.

Slip-controlled brake systems of the type initially referred to are known and which prevent locking of the controlled wheels by virtue of control of the multi-directional control valves which are inserted in the pressure fluid conduit from the braking pressure generator to the controlled wheels and in the pressure fluid return lines from the wheels to the pressure supply reservoir. The risks involved when the wheels become unstable or lock, respectively, in particular the risk of skidding and loss of steerability, thereby will be eliminated or at least reduced considerably. However, such systems do not have any influence on the spinning of wheels due to excessive driving torque.

Moreover, it has also been proposed to design hydraulic brake systems of the like such as to limit traction slip as well. To this end, a connecting valve was employed according to the proposal described in German patent application P No. 33 27 401.0, now U.S. Pat. No. 4,565,411 in which because of the valve the driven wheels will be isolated from the braking pressure generator and connected directly to the auxiliary pressure source as soon as traction slip becomes too high. This allows introduction of hydraulic pressure into the connected wheel brakes even without application of the brake.

According to another solution pressure out of the auxiliary pressure source is supplied directly into the master cylinder for the reduction of traction slip. The pressure propagating by way of a prechamber and by way of check valves in the sleeves of the master cylinder pistons into the working chambers of the master cylinder and from there by way of the inlet valves to the wheel cylinders. The individual multi-directional valves in the pressure fluid conduits to the wheel brakes allow to dose the pressure, if necessary with the assistance of the outlet valves which can establish connection between the wheel brake cylinder and the pressure supply reservoir. The driven wheels must be connected to the master cylinder in a like system.

It is an object of the present invention to improve upon a like brake system in a particularly simple manner and requiring minimal effort so that it can be employed for all-wheel-driven vehicles and which not only prevents locking of the wheels but also limits the traction slip of the wheels to an admissible value.

SUMMARY OF THE INVENTION

This object is achieved in a remarkably simple fashion with a slip-controlled brake system of the type referred to hereinabove, which is improved so that the auxiliary pressure source communicates with the wheel brakes directly connected to the power brake booster and with the working chambers in the master cylinder via electromagnetically actuatable multi-directional control valves which, for the purpose of traction slip control, allow to meter pressure into the wheel brakes directly connected to the power brake booster and into the working chambers in the master cylinder and thus into the wheel brakes connected to the master cylinder.

According to a preferred embodiment of the brake system, the auxiliary pressure source, instead of the power brake booster, is for traction slip control connectable to the wheel brakes which latter are "normally" (i.e., except for in the traction slip control period) connected to the power brake booster, and is connectable to the pressure fluid conduit leading to the master cylinder, by means of two two-way/two-position directional control valves. That is one valve thereof being closed in its inactive position while the other one assumes its opened position when inactive.

Within the scope of the present invention, two wheel brakes can be connected to the power brake booster via one joint two-way/two-position directional control valve which normally assumes its opened position, the said two wheel brakes communicating with the pressure fluid return line via one joint, normally closed two-way/two-position directional control valve, while for traction slip control and additional two-way/two-position directional control valve which normally is in its opened position is inserted into one or into both of the pressure fluid conduits leading to the wheel brakes.

Another embodiment of the present invention provides for traction slip control wherein the auxiliary pressure source instead of the power brake booster is connectable to the pressure fluid conduit leading to the master cylinder by virtue of two two-way/two-position directional control valves, and that pressure fluid lines are provided leading from the master cylinder to the wheel brakes, which latter normally are in direct communication with the power brake booster, the said pressure fluid lines containing normally closed multi-directional control valves which can be switched to their opened position. In this brake system, the pressure fluid lines which extend from the master cylinder to the wheel brakes that normally communicate directly with the power brake booster can be connected to a chamber or a line in the master cylinder into which pressure out of the auxiliary pressure source can be introduced for the purpose of traction slip control.

That is, in the manner proposed by this invention, the slip-controlled brake system mentioned before can be extended by use of only few additional multi-directional control valves to a system which enables to individually control the traction slip at the separate wheels even in an all-wheel-driven vehicle. The valves required to this end may likewise be retrofitted.

BRIEF DESCRIPTION OF THE DRAWING

Further features, advantages and possibilities of application are discernible from the following description of embodiments of the present invention with reference to the accompanying drawing wherein.

DETAILED DESCRIPTION

Figure 1:
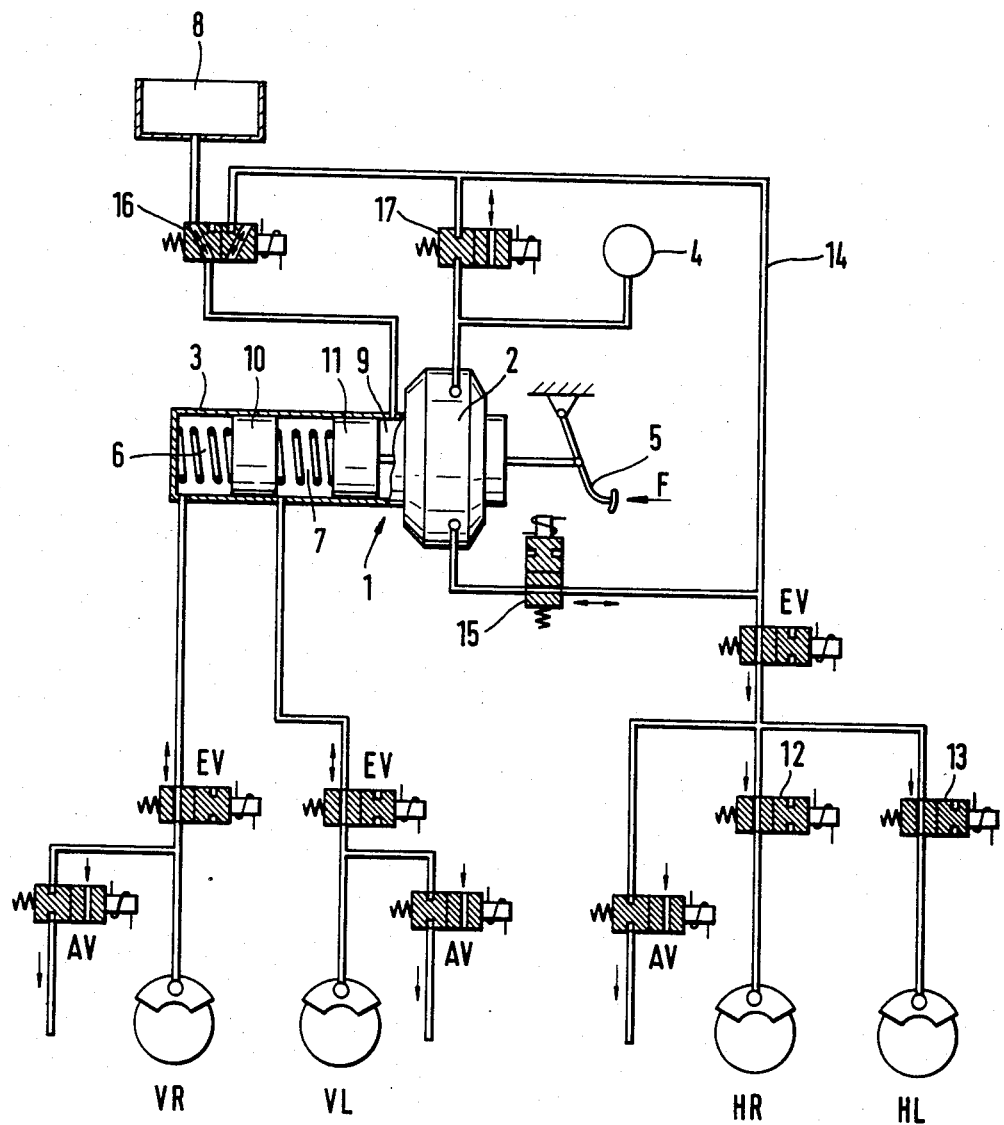
FIG. 1 is the hydraulic circuit configuration of a brake system according to an embodiment of this invention; and, FIG. 2 is, alike the presentation in FIG. 1, a second embodiment of this invention.

According to FIG. 1, the slip-controlled brake system comprises a braking pressure generator 1 which is substantially composed of a hydraulic power brake booster 2 and a master cylinder 3, herein a tandem master cylinder. There is also symbolic illustration of an auxiliary pressure source 4 at the inlet of the power brake booster 2 as well as a brake pedal 5 onto which the force F is exerted in direction of the arrow.

This is direct connection of the rear wheels HR, HL to the power brake booster 2 by way of multi-directional control valves. The front wheels VR, VL communicate with the working chambers 6, 7 by way of hydraulically isolated pressure fluid circuits. The pressure generated in the power brake booster 2 that is proportional to the pedal force F will be transmitted in a known manner directly onto the working pistons 10, 11 in the master cylinder 3.

Finally, there is still provision of a pressure supply reservoir 8 which is connected to the master cylinder 3 via a prechamber 9 illustrated only symbolically. The connection of this prechamber to the secondary sides of the working pistons 10, 11 as well as the conduit for flow of hydraulic energy out of the prechamber 9 into the working chambers 6, 7 when delivering pressure during brake slip control is designed in a known fashion and therefore has not been shown herein.

The wheel brakes of the individual wheels are connected with the braking pressure generator by way of inlet valves EV which normally, i.e. in their inactive position, are switched to be opened, and they are connected with the pressure supply reservoir 8 via normally closed outlet valves AV. The return line via the valves AV to the reservoir 8 is not drawn, but is solely symbolized by the arrows at the exit of the outlet valves AV.

In this arrangement, the rear wheels are connected in parallel as long as the additional two-way/two-position directional control valves 12, 13 are not energized and therefore are opened for the pressure medium, so that one joint inlet valve EV and one outlet valve AV are sufficient for both wheels.

For the control of brake slip and, respectively, for the prevention of locking wheels, beside the inlet valves and outlet valves EV, AV there is still provision of a pressue fluid conduit 14 from the outlet of the power brake booster 2, at which pressure controlled proportionally to the pedal force F is prevailing, to the prechamber 9 via the two-way/two-position directional control valve 15 that is opened in its inactive position and via the three-way/two-position directional control valve 16. During anti-skid control, hydraulic energy will be supplied through this conduit 14 into the working chamber 6, 7 of the master cylinder 3 for compensation of the pressure fluid discharging via the outlet valves AV.

For the control of traction slip, the auxiliary pressure source 4 will be connected to the master cylinder 3 and to the wheel brakes of the front wheels VR, VL and besides directly to the rear wheels HR, HL by way of switching over of the valves 15, 16, 17 in respect of their illustrated switching position which represents the inactive position. The conduit from the auxiliary pressure source 4 to the outlet of the power brake booster 2 will thereby be closed by the valve 15; this valve 15 may be eliminated in some embodiments of the braking pressure generator 1 wherein the outlet of the power brake booster 2 and the prechamber 9 are pressure-balanced during this control period.

The braking pressure for initiation of traction slip can be reduced by means of the inlet valves and outlet valves EV, AV in the embodiment according to FIG. 1, each one valve 12, 13 being inserted in the conduit to the rear wheels between the inlet valve EV and the wheel brakes, in one connecting line or, as is illustrated herein, in both connecting lines with a view to enabling individual control of the two wheels in this control period.

Figure 2:
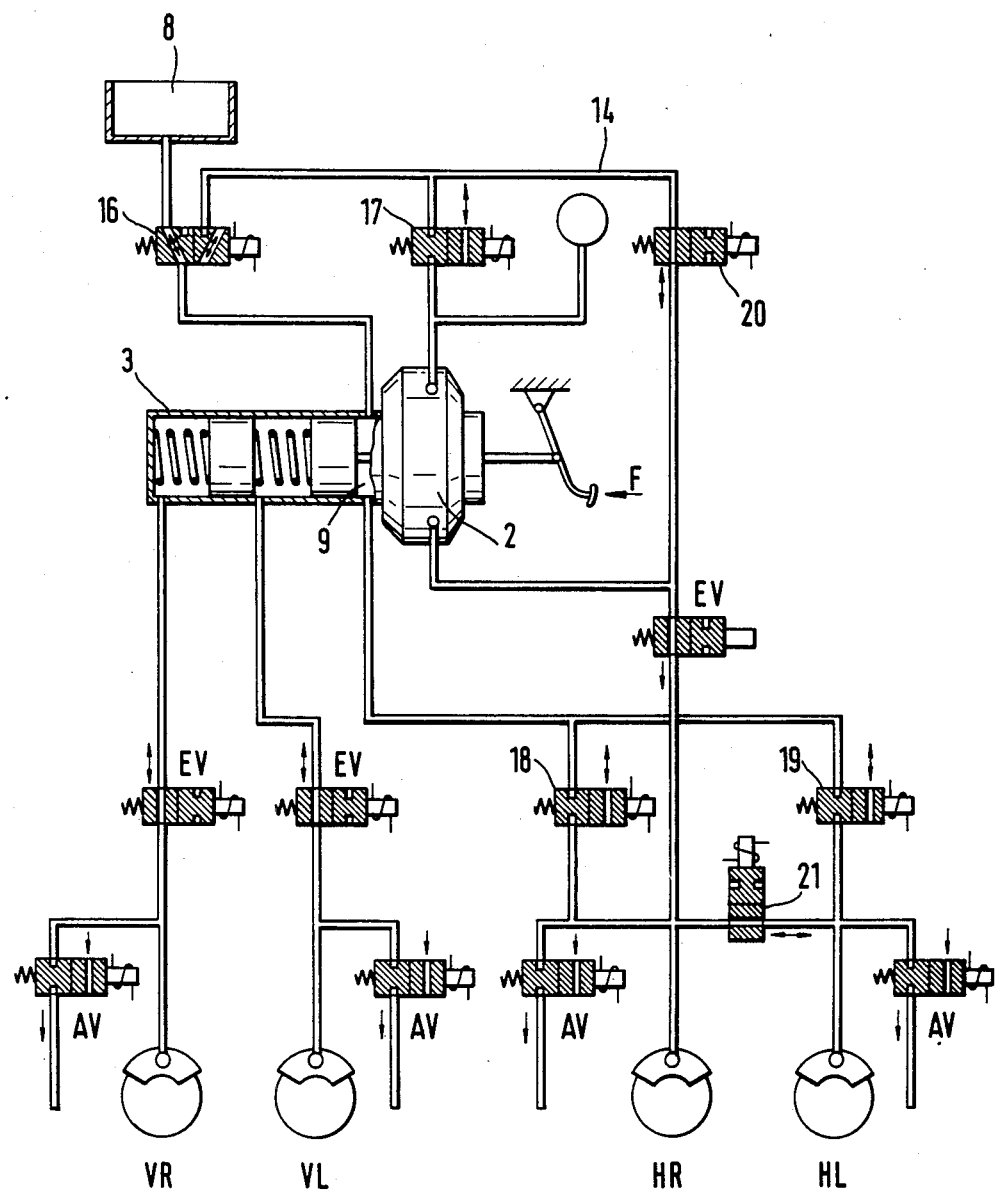

In the system according to FIG. 2, in contrast to the brake system according to FIG. 1, the rear wheels which normally are connected directly to the power brake booster 2 are also in communication with the prechamber 9 of the master cylinder 3 by way of two two-way/two-position directional control valves 18, 19 which are closed in their inactive position. For the control of traction slip at the rear wheels, energization of the valves 18, 19 allows introduction of pressure through the associated conduit. The pressure variation at the rear wheels HR, HL can be de-coupled by means of an additional two-way/two-position directional control valve 21 which is opened in its inactive position. A two-way/two-position directional control valve 20, which is inserted into the pressure fluid conduit 14 from the power brake booster 2 to the master cylinder 3 and which is normally switched to its opened position, likewise serves for de-coupling. Valve 20 is not required if in those control periods in which the valve 16 responds the same pressure prevails at the outlet of the power brake booster 2 as in the prechamber 9.

What is claimed is:

1. A slip-controlled brake system for automotive vehicles with driven front axle and rear axle, equipped with a pedal-actuated braking pressure generator comprising a power brake booster connected to an auxiliary pressure source, which booster communicates directly with a plurality of wheel brakes and which acts upon a master cylinder having working chambers to which said wheel brakes are connected, the brake system including electromagnetically actuatable multi-directional control valves in pressure fluid conduits leading to the wheel brakes, and including pressure fluid return lines which connect the wheel brakes with a pressure supply reservoir and which contain electromagnetically actuatable multi-directional control valves, wherein there is provided a normally closed pressure fluid conduit from the power brake booster to the master cylinder which can be switched to the opened position, and wheel sensors and electronic circuits for the determination of the wheels' rotational behavior and for the generation of valve control signals, wherein the auxiliary pressure source (4) communicates with said wheel brakes (HR, HL) directly connected to the power brake booster (2) and with said working chambers (6, 7) in the master cylinder (3) by way of electromagnetically actuatable multi-directional control valves (16, 17, 18, 19, 20) which, for the purpose of traction slip control, allow pressure into the wheel brakes (HR, HL) directly connected to the power brake booster (2) and into the working chambers (6, 7) in the master cylinder (3) and thereby into the wheel brakes (VR, VL) connected to the master cylinder (3).

2. A brake system as claimed in claim 1, the auxiliary pressure source (4) is connectable to the wheel brakes (HR, HL) for traction slip control which are connected to the power brake booster (2) in the inactive position of the valves, and is connectable to the pressure fluid conduit (14) leading to the master cylinder (3), by means of two two-way/two-position directional control valves (17, 15, 20), with one valve (17) thereof being closed in its inactive position while a second valve (15, 20) is opened in its inactive position.

3. A brake system as claimed in claim 2, wherein two wheel brakes (HR, HL) are connected to the power brake booster (2) via one joint two-way/two-position directional control valve (EV) which normally assumes its opened position, said two wheel brakes (HR, HL) communicating by way of one joint, normally closed two-way/two-position directional control valve (AV) with a pressure fluid return line leading to the pressure supply reservoir (8), and wherein an additional two-way/two-position directional control valve (12, 13) which normally is in its opened position is inserted for traction slip control into at least one of the pressure fluid conduits leading to said wheel brakes.

4. A brake system as claimed in claim 1, wherein the auxiliary pressure source (4) is connectable to the pressure fluid conduit (14) leading to the master cylinder (3) by virtue of two two-way/two-position directional control valves (15, 17, 20), and wherein there is provided pressure fluid lines leading from the master cylinder (3) to said wheel brakes (HR, HL), which latter normally are in direct communication with the power brake booster (2), said pressure fluid lines containing normally closed multi-directional control valves (18, 19) which can be switched to assume their opened position.

5. A brake system as claimed in claim 4, wherein the pressure fluid lines which extend from the master cylinder (3) to the wheel brakes (HR, HL) that normally communicate directly with the power brake booster (2) are connected to at least one of a chamber (9) and a line in the master cylinder (3) into which pressure out of the auxiliary pressure source (4) can be introduced for the purpose of traction slip control.

6. A brake system as claimed in claim 5, wherein the wheel brakes (HR, HL) communicating with the power brake booster (2) are interconnected by way of a two-way/two-position directional control valve (21) normally switched to assume its opened position.

* * * * *